United States Patent
Stenson et al.

(10) Patent No.: US 9,495,722 B2
(45) Date of Patent: Nov. 15, 2016

(54) DEVELOPER CONTROLLED LAYOUT

(71) Applicant: Sony Interactive Entertainment Inc., Tokyo (JP)

(72) Inventors: Richard B. Stenson, San Mateo, CA (US); Christopher Ho, Belmont, CA (US); Mark E. Cerny, Los Angeles, CA (US); Steven Osman, San Francisco, CA (US); Jun Murakawa, Foster City, CA (US); Dmitri Shtilman, Saratoga, CA (US); Jason Scanlin, Los Angeles, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 457 days.

(21) Appl. No.: 13/902,658

(22) Filed: May 24, 2013

(65) Prior Publication Data

US 2014/0347375 A1    Nov. 27, 2014

(51) Int. Cl.
   *G06T 1/20*    (2006.01)

(52) U.S. Cl.
   CPC ....................... *G06T 1/20* (2013.01)

(58) Field of Classification Search
   CPC ............... G09G 5/363; G09G 2360/06; G09G 5/393; G06T 15/005; G06T 1/20; G06T 2200/28; G06T 1/60
   See application file for complete search history.

(56) References Cited

U.S. PATENT DOCUMENTS

| | | | |
|---|---|---|---|
| 7,944,450 B2 | 5/2011 | Bakalash et al. | |
| 8,044,951 B1* | 10/2011 | Brown | G06F 8/54 345/419 |
| 8,134,566 B1 | 3/2012 | Brown et al. | |
| 8,963,918 B2 | 2/2015 | Zhou et al. | |
| 2006/0109270 A1 | 5/2006 | Perey et al. | |
| 2007/0076010 A1* | 4/2007 | Swamy et al. | 345/565 |
| 2007/0220525 A1* | 9/2007 | State | G06F 9/4881 718/107 |
| 2008/0246773 A1 | 10/2008 | Jiao et al. | |
| 2009/0141034 A1 | 6/2009 | Pryor et al. | |
| 2009/0217252 A1 | 8/2009 | Aronson et al. | |
| 2009/0322751 A1* | 12/2009 | Oneppo et al. | 345/426 |
| 2010/0110083 A1 | 5/2010 | Paltashev et al. | |
| 2010/0122264 A1 | 5/2010 | Xiaocheng et al. | |
| 2010/0328327 A1 | 12/2010 | Hervas | |

(Continued)

OTHER PUBLICATIONS

International Search Report and Written Opinion for International Application No. PCT/2014/039430, dated Nov. 6, 2014.

(Continued)

*Primary Examiner* — Maurice L McDowell, Jr.
*Assistant Examiner* — Raffi Isanians
(74) *Attorney, Agent, or Firm* — Joshua D. Isenberg; JDI Patent

(57) ABSTRACT

A method for processing graphics for a GPU program, translating instructions from a shading language into an intermediate language with a front end of a GPU compiler; translating the instructions from the intermediate language into a GPU object language with a back end of the GPU compiler; wherein the instructions in the shading language include instructions defining a layout of resources for the GPU program.

12 Claims, 4 Drawing Sheets

(56) References Cited

U.S. PATENT DOCUMENTS

| | | |
|---|---|---|
| 2011/0113011 A1 | 5/2011 | Prorock et al. |
| 2011/0242117 A1 | 10/2011 | Bolz et al. |
| 2011/0242125 A1* | 10/2011 | Hall .......................... G06T 1/20 |
| | | 345/582 |
| 2013/0021353 A1 | 1/2013 | Drebin et al. |
| 2013/0265309 A1 | 10/2013 | Goel et al. |
| 2014/0281364 A1 | 9/2014 | Buschardt et al. |
| 2014/0347371 A1 | 11/2014 | Stenson et al. |
| 2014/0362093 A1* | 12/2014 | Lorach .................. G06T 15/005 |
| | | 345/522 |

OTHER PUBLICATIONS

Bentley Jon L. Multidimensional Binary Search Trees in Database Applications IEEE Ttransactionson Software Engineering,vol. SE-5, No. 4, Jul. 1979,par, I"Introduction".

International Search Report and Written Opinion for International Application No. PCT/US2014/039436, dated Oct. 16, 2014.

Marks Michal et al. Heterogeneou GPU&CPU cluster for high performance computing in cryptography Computer Science 13(2) 2012, par. 5 "Parallel implementation of cryptography and cryptanalysis" par, 5,1. "Cryptography and cryptanalysis on GPU", par.5 .2. "Numerical results in HGCC".

Nathan A. Carr et al. The Ray Engine. Graphics Hardware, 2002,par,3 "Ray Tracing with the GPU", par.3.1. "Ray Casting".

Non-Final Office Action for U.S. Appl. No. 13/902,661, dated May 4, 2015.

Non-Final Office Action for U.S. Appl. No. 13/902,661, dated Oct. 7, 2015.

Final Office Action for U.S. Appl. No. 13/902,661, dated May 24, 2016.

\* cited by examiner

DEVELOPER CONTROLLED LAYOUT

FIELD OF THE DISCLOSURE

The present disclosure relates to graphics processing. More specifically, the present disclosure relates to a developer controlled layout of shader resources for a program that can implemented by a graphics processing unit (GPU).

BACKGROUND

Graphics processing typically involves coordination of two processors, a central processing unit (CPU) and a graphics processing unit (GPU). The GPU is a specialized electronic circuit designed to accelerate the creation of images in a frame buffer intended for output to a display. GPUs are used in embedded systems, mobile phones, personal computers, workstations, and game consoles. A GPU is typically designed to be efficient at manipulating computer graphics. GPU's often have a highly parallel processing architecture that makes the GPU more effective than a general-purpose CPU for algorithms where processing of large blocks of data is done in parallel.

The CPU may send commands to the GPU to implement a particular graphics processing task, e.g. render a particular texture that has changed with respect to a previous frame in an image. These commands are commonly referred to as "draw calls", and there may be hundreds or thousands of draw calls in any particular frame.

In conventional setups, in order to implement each draw call the CPU has to perform certain setup work for GPU programs, known as shaders, to run. This typically includes setting up resources for the shaders to use in the form of buffers of data as well as uniform constants that may change between draw calls but are uniform for any particular draw call. Such resources may include texture bitmaps, pointers to texture bitmaps, samplers, and constants such as collections of floating point or integer values, and the like. These resources may be stored in a table, sometimes called a resource table. A graphics application program interface (API) implemented by the CPU may assign slots in a ring buffer for allocation of resources from the resource table to shaders that run on the GPU. A software component run by the CPU, sometimes referred to as a constant update engine (CUE), allocates the slots in the buffer and maintains the data for use by the shader in the resource table. This is a complicated process that has lots of overhead.

Anytime even a single entry in the resource table changes (e.g., one texture changes with respect to a previous draw call for the frame) the whole resource table is copied by the CPU. Each draw call needs its own resource tables. If the resource table is wholly the same between draw calls (i.e., nothing has changed for the draw), then the data can be reused. However, since the data is explicitly laid out as an entire table of data, if only one value needs to be changed in that data, then a new table must be copied with that change. Moreover, the CUE cannot simply change the value in the previous table because draw calls are not issued one at a time, but are rather batched together and kicked off at the same time. All simultaneously kicked draw calls must therefore have their own set of data, unless the developer inserts specific synchronization points which incur their own time penalty.

Moreover, each draw call may have a different data layout. Consequently, the CPU has had to be able to deal with different data layouts for each draw call. This can take up a significant percentage of the GPU's time. Recently, systems have been developed with increasingly more powerful GPU. In some cases the raw processing power of the GPU can exceed that of the CPU. However, utilization of this power is often limited by the CPU-GPU interaction.

It is within this context that aspects of the present disclosure arise.

SUMMARY

According to aspects of the present disclosure, a method of compiling instructions for a GPU program may include translating instructions from a shading language into an intermediate language with a front end of a GPU compiler; and translating the instructions from the intermediate language into a GPU object language with a back end of the GPU compiler; wherein the instructions in the shading language include instructions defining a layout of resources for the GPU program.

In some implementations, the instructions in the shading language defining the layout are cross-compilable to a language executable by a CPU.

In some implementations, the cross-compilable instructions are incorporated into a header of the instructions in the shading language.

In some implementations, the instructions defining the layout of resources include instructions defining an allocation of memory resources for the GPU program.

In some implementations, the instructions defining the layout of resources include instructions defining a resource descriptor for the GPU program.

In some implementations, the instructions defining the layout of resources are programmed by a developer of the GPU program.

In some implementations, the instructions defining the layout of resources include a shader resource table.

In some implementations, the GPU program is configured to render graphics for a corresponding application implemented by the CPU.

In some implementations, the method further includes running the GPU program with a GPU and running the corresponding CPU program with the CPU.

In some implementations, the instructions defining the layout of resources include instructions defining a layout of buffers of data and instructions defining a layout of uniform constants.

According to aspects of the present disclosure, a system for processing graphics, the system including a central processing unit (CPU); a graphics processing unit (GPU); a memory; and a GPU compiler embodied in the memory and executable by the CPU, wherein the GPU compiler is configured to implement a method of compiling instructions for a GPU program, the method comprising: translating the instructions from a shading language into an intermediate language with a front end of the GPU compiler; and translating the instructions from the intermediate language into a GPU object language with a back end of the GPU compiler; wherein the instructions in the shading language include instructions defining a layout of resources for the GPU program.

In some implementations, the GPU compiler is further configured to cross-compile the instructions defining the data layout into a language executable by the CPU.

According to aspects of the present disclosure, a non-transitory computer readable medium having embodied therein computer readable instructions can be configured to implement a method of compiling instructions for a GPU program, the method including translating instructions from a shading language into an intermediate language with a front end of a GPU compiler; and translating the instructions from the intermediate language into a GPU object language with a back end of the GPU compiler; wherein the instructions in the shading language include instructions defining a layout of resources for the GPU program.

BRIEF DESCRIPTION OF THE DRAWINGS

The teachings of the present disclosure can be readily understood by considering the following detailed description in conjunction with the accompanying drawings, in which.

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

In light of the aforementioned overhead and frequent CPU-GPU interaction, it would be desirable to provide increased control to developers and programmers of applications implementing graphics processing using modern hardware architectures. Because developers of the programs typically have the best knowledge of which data is used frequently and the best way to lay out data for applications running on CPUs, as well as associated GPU programs that render their corresponding graphics, it would be desirable to provide a mechanism that allows developers to define a data layout for GPU programs. Accordingly, developers would be able to define a data layout that maximizes data re-use between calls. In general, a data layout describes the arrangement of resources used by the GPU programs. Such a data layout may include an allocation of memory for underlying data resources and a set of resource descriptors, which may be arranged in the form of a table. Each entry in the table corresponds to a particular resource descriptor. Each resource descriptor may include information identifying a data type (e.g., integer or floating point number, texture, etc.), a data size (e.g., in bits, bytes or width/height), and a pointer to a memory location for the underlying resource.

In accordance with aspects of the present disclosure, rather than having a data layout and shader resource set up dictated by a compiler's back end, implementations of the present disclosure include shading language instructions that can define a data layout for resources used by GPU programs to render graphics. Moreover, implementations can include instructions defining an entire data layout for the entire graphics pipeline. Aspects of the present disclosure include shading language constructs to allow these pre-defined data layouts to be accepted by a compiler, and in particular, a GPU compiler's back end. Such features allow a developer (programmer) to define the data layout for a shader that is run by the GPU. Moreover, implementations of the present disclosure can bypass performing this set up work with a constant update engine (CUE) of a graphics API running on a GPU, thereby providing increased ability to utilize the full performance potential of the GPU by bypassing a great deal of the overhead of the graphics API.

Introduction

Figure 1A:
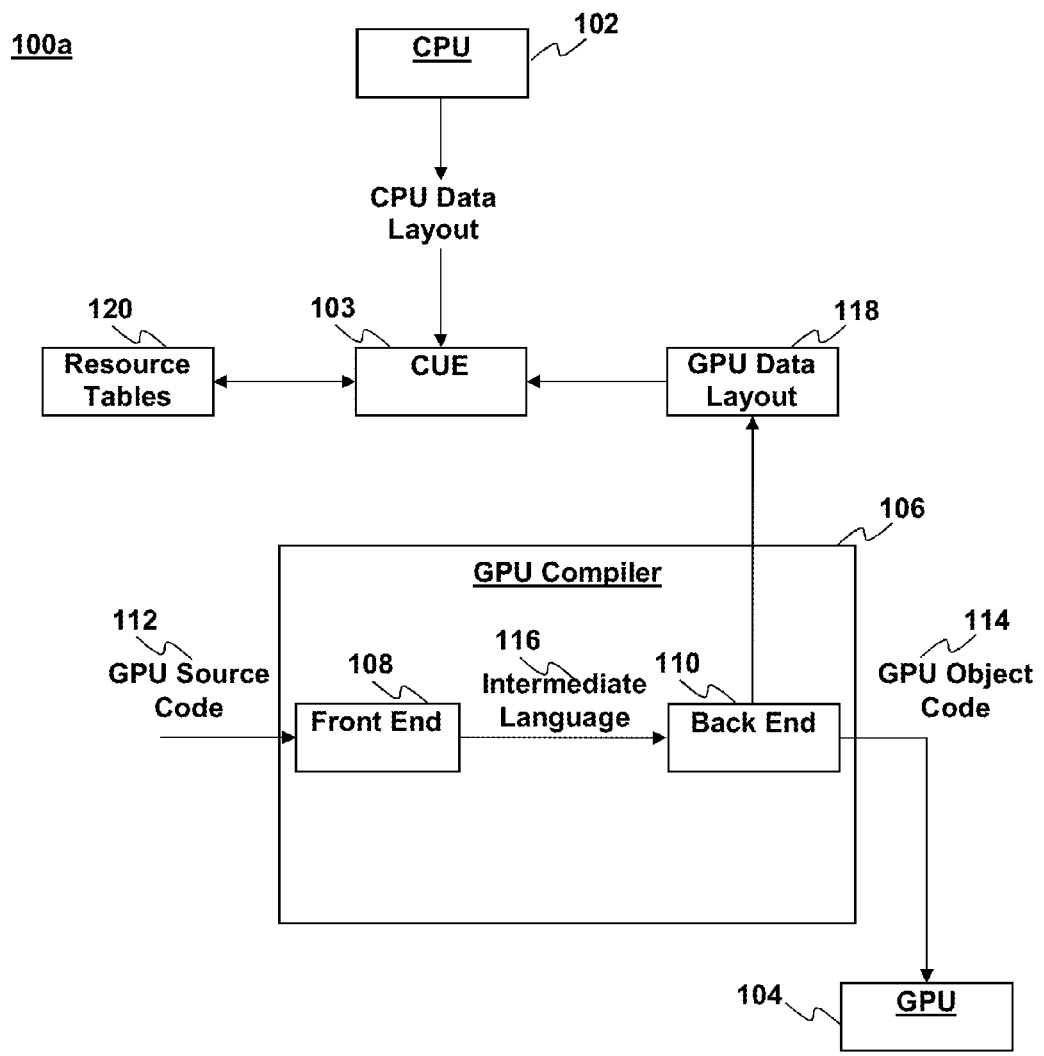
FIG. 1A depicts a flow diagram of a graphics processing method illustrative of how set up work performed by a CPU.
Figure 1A:

An illustrative graphics processing method 100a in which a software component 103, referred to herein as a constant update engine (CUE), that is implemented by a CPU 102 has to perform set up work for GPU shaders to run on a GPU 104 of the system is depicted in FIG. 1A. The GPU compiler 106 converts GPU source code 112 into GPU object code 114 that is executable by the GPU 104 so that instructions embodied in the code can be implemented by the shaders. In order compile the instructions into a form executable by the GPU 104; the GPU compiler 106 includes both a front end 108 and a back end 110. The front end of the compiler first translates the instructions from the GPU source code, which may be in a particular shading language used by the system, into an intermediate language 116. The back end of the compiler then translates the instructions from the intermediate language 116 into the GPU object code 114 that is executable by the GPU 104, which may be machine code.

One drawback with such a setup is that the layout 118 of resources for the GPU programs is dictated by the back end 110 of the compiler 106 in a way that may be inefficient. Because the back end 110 of the compiler dictates the data layout 118 and setup of shader resources, developers of applications to be implemented by the CPU 102 and having graphics rendered by a GPU 104 have little control over how shader resources are managed. Accordingly, there may be little data re-use between draw calls, and the constant management and copying of resource tables 120 by the CUE 103 of the CPU 102 between each draw call slows down performance of the system. Moreover, the large amount of overhead and bookkeeping associated with this constant CPU-GPU interaction can create a bottleneck and prevent the system from fully utilizing the GPU's processing power.

The CPU overhead is partly a result of the way graphics processing systems handle memory access from a graphics pipeline. Conventional graphics processing systems typically handle such memory access done through a set of named access points. Portions of the graphics pipeline refer to these access points by name, and the application binds memory resources to each name through the API. The access points act as an indirection, decoupling shaders and pipeline configurations from specific memory resources and their properties. However, the CPU 102 (specifically, the CUE 103) must still keep track of the memory locations of these resources.

Some graphics processing systems attempt to address this so-called "bindless" memory access that allows a developer to set a pointer to a portion of a data layout, e.g., a particular resource definition. However, even in such systems the developer has no control over the design of the data layout, which is dictated by part of the GPU compiler.

Figure 1B:
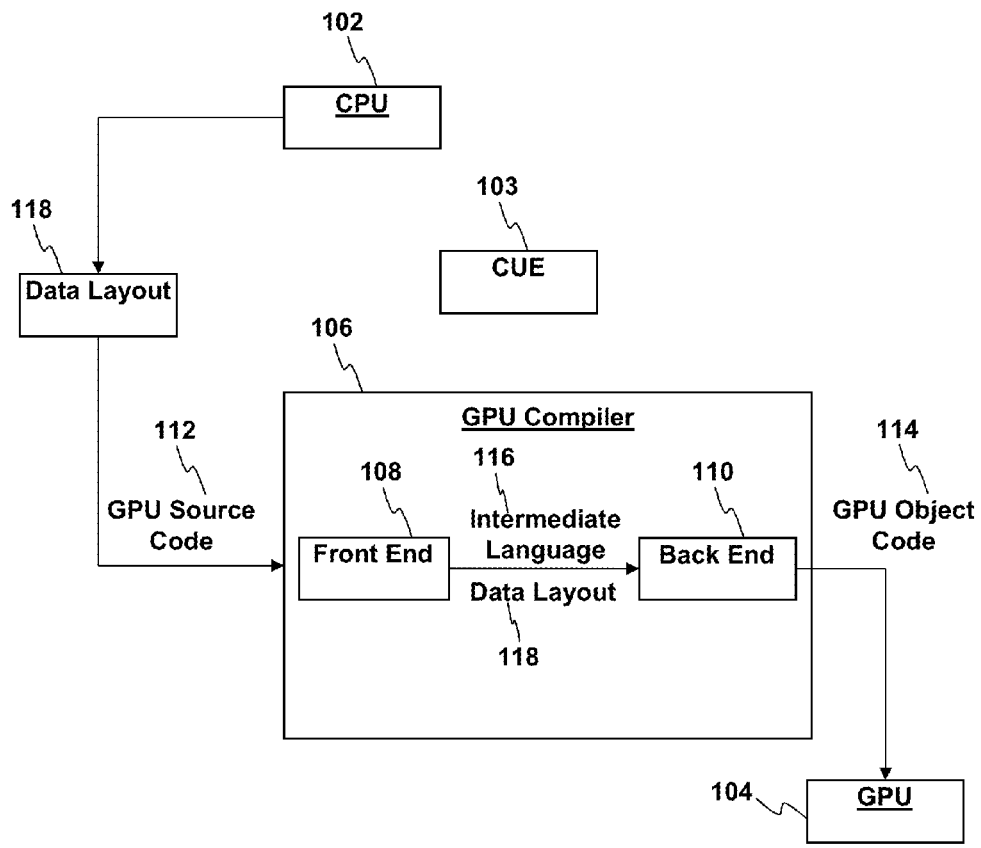
FIG. 1B depicts flow diagram of a graphics processing method according to an aspect of the present disclosure.

FIG. 1B depicts a method 100b for implementing graphics processing according to aspects of the present disclosure. In the illustrated implementation, the GPU compiler 106 is configured to accept a layout 118 of shader resources dictated to it in the source code 112 of the compiler. In order to enable the compiler 106 to accept the data layout 118, the shading language of the source code 112 includes language constructs that allow the back end 110 of the compiler to accept a pre-defined data layout.

The shading language of the GPU code may include constructs that allow developers to include instructions in the source code 112 that define a layout fed into compiler 106. Developers may define the data layout in the form of one or more shader resource tables included in the shading language instructions for a particular application to be run on the system. Likewise, the intermediate language 116 includes the ability to define the layout 118 in order to dictate to the back end of the compiler a data layout that is utilized by shaders of the GPU 104 executing object code 114. Accordingly, in the illustrated implementation, a developer of an application to be implemented by the processors can define the layout 118 in a manner that efficiently organizes the data and maximizes reuse of data between draw calls.

Resources used by the shaders may include buffers of data, such as colors, textures, vertex buffers, and the like, pointers to other resource tables, as well as uniform constants that are uniform across a draw call. Developers of applications running on the system have the best knowledge of how to optimize the layout of data for their particular case. Accordingly, developers, i.e. creators of the programs for the particular application running on the system that includes graphics, can define the data layout through shader resource tables that define a data layout for their particular case.

For example, developers have knowledge of what data between calls changes frequently and what data changes infrequently. Certain data may be constant for a particular frame of a graphic, or even for an entire application. Aspects of the present disclosure allow a developer to define shader resource tables that configure the data layout of resources utilized by the GPU shaders. Moreover, the method can bypass the CUE 103 when implementing a draw call because the layout of shader resources utilized by the GPU programs is already pre-defined in the instructions of the shading language. This can improve performance by avoiding overhead associated with the constant updating and copying of entire resource tables each time a texture changes between draw calls. In some implementations, the CUE 103 may still be utilized to manage some data. In yet further implementations, the CUE 103 may be bypassed completely. In one implementation, the shading language construct includes cross-compilable definition of shader resources that is executable or shareable by both the CPU 102 and GPU 104 of a graphics processing system. By way of example, and not by way of limitation, this cross-compilable definition may be implemented as a header incorporated into the shading language that includes the developer-defined layout of resources in the form of one or more shader resource tables. The shading language may be mimicked in the CPU language allowing a developer to set up resources and coordinate corresponding CPU and GPU data layout easily when creating programs for a particular application. For example, any change to the data layout that the programmer makes during creation of an application can be made on both the CPU and GPU sides with the same change to the cross-compilable definition, thereby greatly facilitating the programming process and ensuring consistency.

By way of example, and not by way of limitation, the following illustrative code can be incorporated in the graphics instructions of the shader language. In the following example, the shader on a GPU 104 can use a layout in the form of a resource table having a configuration that is set up by a programmer through the CPU 102.

A header in a shading language that is shareable in the CPU language can be set up as follows. This header can be later represented by "layout.h":

```
struct TextureData;
{
    Texture2D<float> Tex1;
    SamplerState S1;
};
struct PSData
{
    TextureData *texdata;
};
```

Usage of the above header "layout.h" in the shading language may be as follows:

```
include "layout.h"
float4 main(PSData data : S_SRT_DATA) : S_Target_Output
{
    return data.texdata->tex1.Sample(data.texdata->S1, float 2(0.5,0.5));
}
```

In the above, the operators (→) represent pointers to locations in memory. It is noted that shading languages do not normally have such pointers.

The following C++ CPU set up can be used to share the layout with a GPU shader:

```
include "layout.h"
void setup(PSData& data, ...)
{
    data.texdata = new TextureData;
    data.texdata->Tex1.init(...)
    data.texdata->s1.init(...)
}
```

In the preceding example, S_SRT_DATA is a specific semantic denoting the PSData data input as the shader resource table layout and S_Target_Output is a Pixel Shader Render Target output.

Accordingly, using the above illustrative example, a layout identified as "layout.h" can be set up with a CPU and then imported to a shader of a GPU. There is no need for a constant update engine to keep track of the memory locations of various resources with respect to a pre-defined fixed layout since developer has freedom to choose the layout and import it directly into the shader via the compiler front end.

Method

Figure 2:
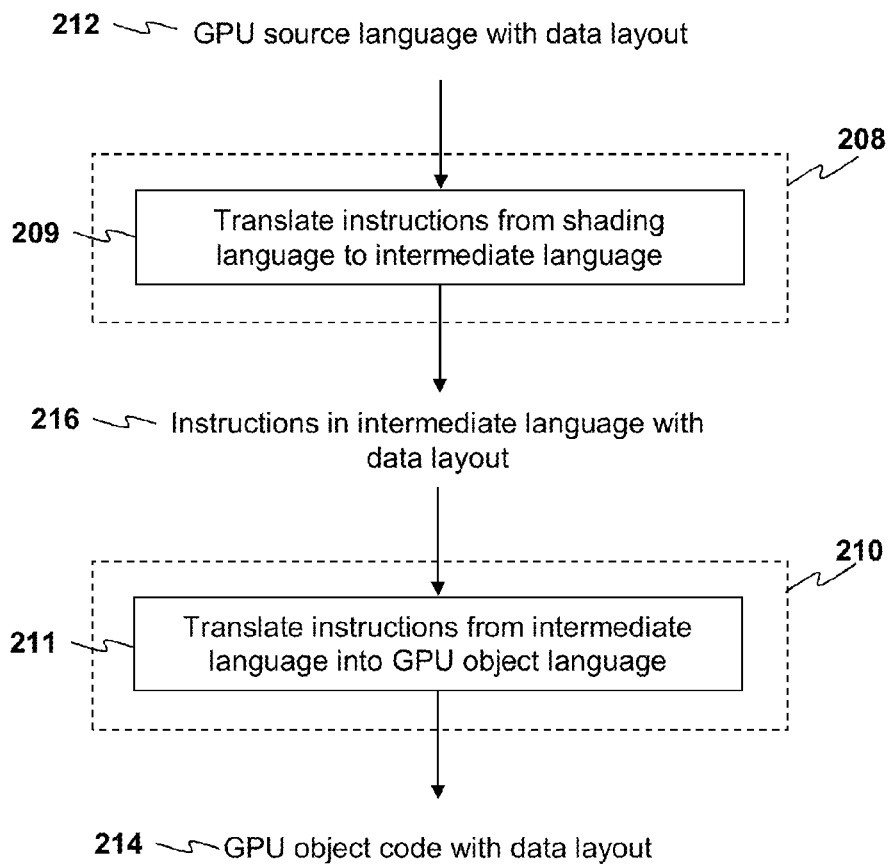
FIG. 2 is a flow diagram of a graphics processing method according to an aspect of the present disclosure.

Another implementation of the present disclosure is depicted in FIG. 2. FIG. 2 depicts a flow chart for a method 200 of processing graphics according to aspects of the present disclosure. In the method 200, graphics instructions in a GPU source language 212 are translated into a language 214 executable by GPU programs and shaders of a GPU. The method 200 includes translating the instructions at 209 from the GPU source language into an intermediate representation 216 with a front end of a GPU compiler 208. The shading language 212 and the intermediate language 216 include instructions defining a data layout of resources that can be dictated to the back end of the compiler 210. In some implementations, the GPU source language is a shading language that includes the data layout as a shader resource definition that is cross-compilable with a CPU platform. The data layout of the graphics instructions may be pre-defined by a developer of the shaders and their corresponding CPU application.

At 211, the method 200 further includes translating the instructions with a back end of the compiler 210 from the intermediate language into low level object code 214 that is executable by the GPU and its corresponding shader programs. The object code may be machine code for the particular GPU platform running the shaders. The shaders may then utilize the pre-defined data layouts dictated to the back end of the compiler after translation at 211.

System

Figure 3:
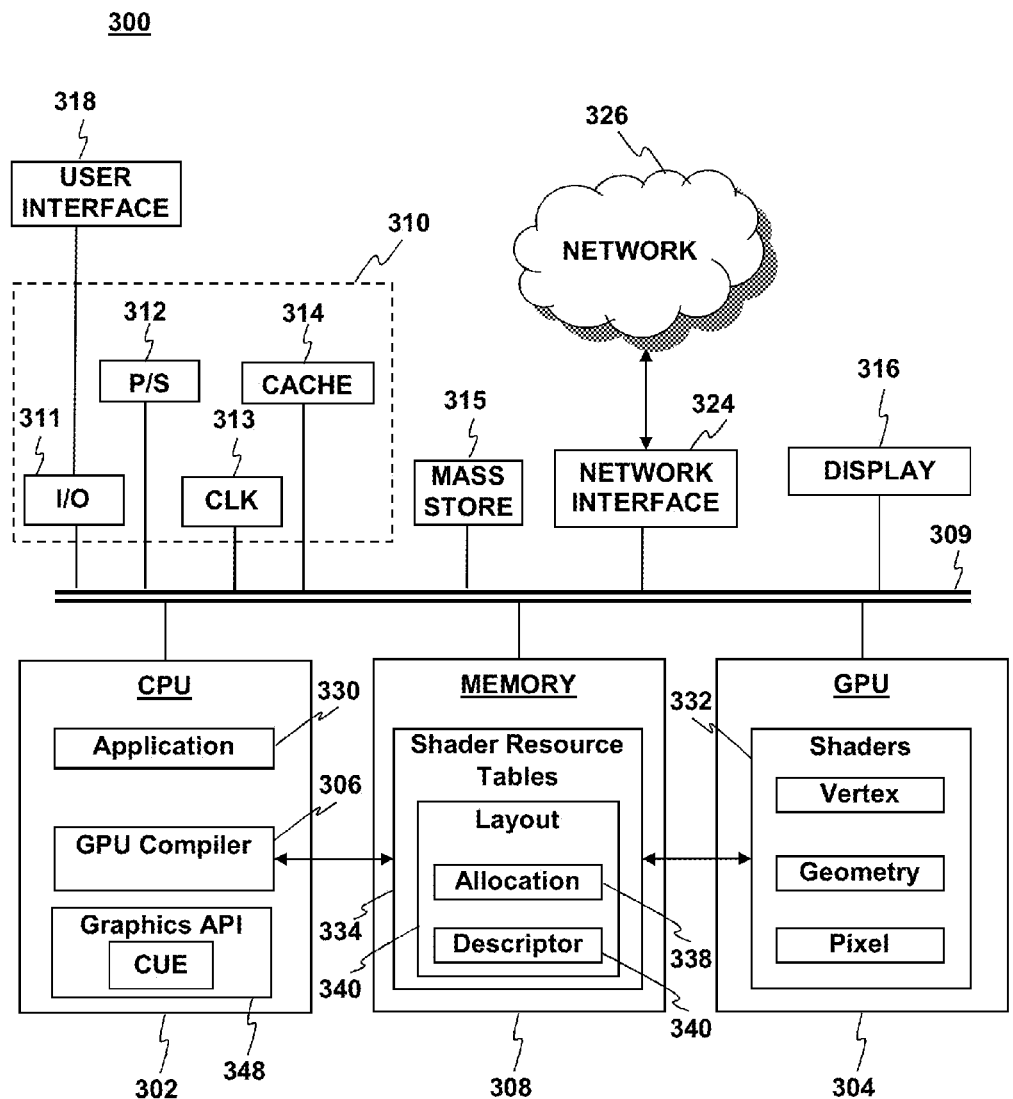
FIG. 3 is a block diagram of a graphics processing system according to an aspect of the present disclosure.

Aspects of the present disclosure include systems configured to implement computer graphics processing, as described above. By way of example, and not by way of limitation, FIG. 3 illustrates a block diagram of a computer system 300 that may be used to implement video coding according to aspects of the present disclosure. The system 300 generally may include a central processor unit (CPU) 302, a graphics processor unit (GPU) 304, and a memory 308. The memory 308 may be accessible by both the CPU 302 and the GPU 304. In some implementations, memory may be a unified memory, such as a heterogeneous unified memory architecture, that is accessible to both the CPU and GPU. In some implementations, the CPU 302 and GPU 304 may distinct processors. In other implementations, the CPU and GPU may be in the form of an integrated processor. The CPU 302 and GPU 304 may each include one or more processor cores, e.g., a single core, two cores, four cores, eight cores, or more. The unified memory 308 may be in the form of an integrated circuit that provides addressable memory, e.g., RAM, DRAM, and the like. The system 300 may be configured to implement developer defined shader resource data layout, as discussed above. The system 300 may be embodied in any of a variety of hardware setups having modern graphics processors that run hardware shaders, such as, e.g., a desktop or laptop computer, a tablet computer, a videogame console, a mobile phone, smart phone, or the like.

The CPU 302 and GPU 304 may access the unified memory 308 using a data bus 309. In some cases, it may be useful for the system 300 to include two or more different buses. For example one bus may be characterized by a high bandwidth but also a high latency. Another bus may be characterized by a lower latency but also a lower bandwidth. It may be impractical (or too expensive) to implement a high latency, low bandwidth bus. In such a case, the system could use the high bandwidth, high latency bus in situations where the high bandwidth is more important, e.g., where a large amount of data is to be transferred to or from memory in one data transfer operation. The low bandwidth, low latency bus may be more useful in other situations where low latency is more important, e.g., where smaller amounts of data must be transferred to or from memory in a large number of separate data transfer operations. By way of example, and not by way of limitation, the CPU 302 may be configured to access one of the buses while the GPU 304 may be configured to access both buses. In some implementations, the GPU 304 is configured to access the memory via a high bandwidth, high latency bus.

The unified memory 308 may contain data that can be accessed by the CPU 302 and GPU 304. Such data may include one or more resource descriptors 307. Programs may also be stored in the memory 308 in the form of CPU code that can be executed by the CPU 302 or GPU code that can be executed the GPU 304. The CPU may implement an application 330, such as, e.g., a video game or other application that also runs in conjunction with graphics processing by the GPU 304. The CPU 302 may also implement compilation of graphics instructions by implementing the GPU compiler 306 to translate graphics instructions into GPU executable code for GPU programs 302. The GPU compiler may translate GPU code from a shading language that includes language constructs that allow a developer of the application 330 to define shader resource tables 334. In some implementations, compilation may be performed offline. In yet further implementations, it is possible to perform the compilation at run-time.

The unified memory 308 may store application programs 330, application data, a GPU driver that implements the compiler 306 and GPU driver data that can be used by the CPU 302 to set up programs run by the GPU 304. By way of example and not by way of limitation the application program 330 may generate calls to a graphics API 348 in order to produce a desired set of results, which may be in the form of a sequence of graphics images. The application program 330 may also transmit one or more shading programs to the graphics API for processing within the GPU driver. The high-level shading programs are typically source code text of high-level programming instructions that are designed to operate on one or more shaders within the GPU 304. The graphics API functionality is typically implemented within a GPU driver.

The resource tables 334 may define a data layout 336 for the shaders 332 of the GPU to run. The layout 336 may identify a location of resources in memory 308 so that the shaders 332 may locate and access shader resource when processing graphics in conjunction with implementation of the application 330. The layout out may also include an allocation of memory for resources 338 and resource descriptors 340, each of which may also be pre-defined and controlled by a creator of the programs for application 330. Each resource descriptor 340 may include information identifying a data type for each resource (e.g., whether the data is a texture, integer number, floating point number, character string, etc.), a size of the corresponding data (e.g., height and width for a texture, number of bytes in a number or string, etc.) and a pointer to a location in the unified memory 308 of the corresponding data.

The unified memory 308 may also include resources, e.g., code and/or data used by the GPU. Such resources may include, but are not limited to machine code shader programs 332, a buffer object memory, texture buffer and frame buffer. The shader programs 332 may be transmitted from graphics API 348 (e.g., via a GPU driver) to the unified memory 308. The shader programs 332 may include, without limitation, a vertex shader program, a geometry shader program, fragment shader program, or any number of variations of each. The buffer object memory may include a uniform storage buffer, a texture buffer, a vertex buffer, and a frame buffer. The uniform storage buffer may be used to store one or more uniform variables, also called "uniforms." A uniform variable is held constant during a given invocation of the associated shader but may be altered between invocations. The texture buffer may be used to store data elements, which may be organized in one-dimensional arrays. The vertex buffer may be used to store data elements describing the position and other attributes of vertices provided as inputs to a vertex shader 342.

The frame buffer may be used to store data representing one or more two-dimensional surfaces that are used to drive the display 316. The GPU 304 may use such data to render one two-dimensional surface while a second two-dimensional surface is used to drive a display 316. Data stored within the texture and the frame buffer may be accessed with the assistance of application specific hardware that provides for a dimensional access view of the data. For example a two-dimensional surface may be addressed with the assistance of a hardware unit that transposes a horizontal and vertical surface location into a physical memory address that corresponds to the location.

The GPU 304 may implement the shader programs 332, which may include the vertex shader 342, a geometry shader 344 and a fragment shader 156 and a memory management unit (MMU) 158. As is well-known, the vertex shader 342 may receive a sequence of one or more sets of vertex attributes from the application 330. Each set of vertex attributes may be associated with one vertex and one or more vertices may be associated with a geometric primitive. The vertex shader 342 can process the vertex attributes, performing such operations as evaluating the vertex's position relative to the viewer and evaluating lighting equations to determine each vertex color. The vertex shader 342 may also use data from the buffer object memory. For example, the vertex shader 342 may use data from the uniform storage buffer 164 or the texture buffer 166. The vertex shader 342 may execute machine code that imparts specific processing behavior according to specific requirements and specifications of the application program 330.

The geometry shader 344 may receive one or more sets of processed vertices from the vertex shader 342 and perform per-primitive operations on vertices grouped into primitives such as triangles, lines, strips and points emitted by the vertex shader 342. Such operations may enable functionality such as shadow volume generation and procedural synthesis. The geometry shader 344 may execute machine code that imparts specific processing behavior according to specific requirements and specifications of the application program 330.

A fixed-function rasterizer (not shown) may be situated between the geometry shader 344 and a pixel shader 346 to scan convert an individual geometric primitive into a set of fragments with interpolated vertex attributes. The pixel shader 346 processes the fragments, each containing fragment data, which may include raster position, depth or interpolated vertex attributes, such as texture coordinates, opacity, and other relevant per-pixel data, to produce final pixel values. The final pixel values may be stored in the frame buffer by a fixed-function raster operations unit (not shown) that also performs operations such as depth and stencil tests as well as any blending of the final pixel values with values currently stored in the frame buffer. The pixel shader may execute machine code that results in specific processing behavior according to specific requirements and specifications of the application program 330.

The GPU may implement GPU programs which may include shaders 332. The shader programs 332 of the GPU may include, e.g., vertex shaders, geometry shaders, and pixel shaders. Shaded and rendered textures by the GPU may be output to display 316 in conjunction with functions associated with the application 330. The shader resource table(s) permits setup work for the GPU programs to bypass the CUE of the graphics API 348.

The CPU 302 and GPU 304 may temporarily store part of respective code or data in registers. The CPU code and GPU code may be configured to implement a computer graphics method of the type described above with respect to FIG. 2. In particular, the CPU code may include one or more instructions that, when executed, translate instructions from a shading language into an intermediate language, and translate the instructions from the intermediate language into a GPU target language, wherein the instructions in the shading language include instructions defining a layout of resources for the GPU programs. The GPU code may include one or more instructions that, when executed, render textures and perform certain graphics processing tasks in accordance with instructions translated by the GPU compiler 306. In cases where there are two or more data busses 309, the instructions may further specify which data bus the GPU 304 can use to access the memory 308. The code for the CPU and GPU programs may be in any suitable processor readable language, e.g., a higher level language such as C, C++, JAVA, and intermediate level language such as Assembly, or machine readable code depending on the nature of the CPU and GPU. The CPU code and GPU code may be stored in a non-transitory computer readable medium, e.g., a computer memory or mass storage device in a form that is readable (or even executable) by the CPU 302 or GPU 304.

The system 300 may also include well-known support functions 310, which may communicate with other components of the system, e.g., via the bus 309. Such support functions may include, but are not limited to, input/output (I/O) elements 311, power supplies (P/S) 312, a clock (CLK) 313 and cache 314. The apparatus 300 may optionally include a mass storage device 315 such as a disk drive, CD-ROM drive, flash memory, tape drive, or the like to store programs and/or data. The device 300 may also optionally include the display unit 316 and user interface unit 318 to facilitate interaction between the apparatus 300 and a user. The display 316 is an output device capable of emitting a visual image corresponding to an input data signal. The input data signal to the display 316 may be generated by scanning out the contents of one or more frames of image data that is stored in the unified memory 308, e.g., in a frame buffer. The display unit 316 may be in the form of a flat panel display (e.g., liquid crystal or light emitting diode (LED) or plasma screen), cathode ray tube (CRT) screen, touchscreen, or other device that can display text, numerals, graphical symbols or images.

The user interface 318 may include a keyboard, mouse, joystick, light pen, game controller, touchscreen, or other device that may be used in conjunction with a graphical user interface (GUI). The system 300 may also include a network interface 324 to enable the device to communicate with other devices over a network 326. The network 326 may be, e.g., a local area network (LAN), a wide area network such as the internet, a personal area network, such as a Bluetooth network or other type of network. These components may be implemented in hardware, software, or firmware, or some combination of two or more of these.

Aspects of the present disclosure enable developers to control layout of resources used by GPU programs. This can avoid unnecessary overhead and bookkeeping associated with constant CPU-GPU interaction to set up resources for GPU programs to run. This can also facilitate developers to only change those portions resource tables that change between draw calls. Allowing developers to control data layout can allow developers to organize data in a way that maximizes data re-use between draw calls and achieve a significant performance boost in graphics processing applications.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method of compiling instructions for a GPU program, the method comprising:
   translating the instructions for the GPU program from a shading language into an intermediate language with a front end of a GPU compiler; and
   translating the instructions from the intermediate language into a GPU object language with a back end of the GPU compiler;
   wherein the instructions for the GPU program in the shading language include instructions defining a layout of resources for the GPU program, wherein the instructions in the shading language defining the layout are cross-compilable to a language executable by a CPU, wherein the GPU compiler is configured to cross-compile the instructions in the shading language defining the layout.

2. The method of claim 1, wherein the cross-compilable instructions are incorporated into a header of the instructions in the shading language.

3. The method of claim 1, wherein the instructions defining the layout of resources include instructions defining an allocation of memory resources for the GPU program.

4. The method of claim 1, wherein the instructions defining the layout of resources include instructions defining a resource descriptor for the GPU program.

5. The method of claim 1, wherein the instructions defining the layout of resources are programmed by a developer of the GPU program.

6. The method of claim 1, wherein the instructions defining the layout of resources include a shader resource table.

7. The method of claim 1, wherein the GPU program is configured to render graphics for a corresponding CPU program implemented by the CPU.

8. The method of claim 7, wherein the method further includes running the GPU program with a GPU and running the corresponding CPU program with the CPU.

9. The method of claim 1, wherein the instructions defining the layout of resources include instructions defining a layout of buffers of data and instructions defining a layout of uniform constants.

10. The method of claim 1, wherein the GPU object language is machine code.

11. A system for processing graphics, the system comprising:
   a central processing unit (CPU);
   a graphics processing unit (GPU);
   a memory;
   and a GPU compiler embodied in the memory and executable by the CPU, wherein the GPU compiler is configured to implement a method of compiling instructions for a GPU program in a shading language, the method comprising:
   translating the instructions for the GPU program from a shading language into an intermediate language with a front end of the GPU compiler; and
   translating the instructions from the intermediate language into a GPU object language with a back end of the GPU compiler;
   wherein the instructions for the GPU program in the shading language include instructions defining a layout of resources for the GPU program, wherein the GPU compiler is further configured to cross-compile the instructions defining the resource layout into a language executable by the CPU.

12. A non-transitory computer readable medium having embodied therein computer readable instructions configured to implement a method of compiling instructions for a GPU program, the method comprising:
   translating the instructions for the GPU program from a shading language into an intermediate language with a front end of a GPU compiler; and
   translating the instructions from the intermediate language into a GPU object language with a back end of the GPU compiler;
   wherein the instructions for the GPU program in the shading language include instructions defining a layout of resources for the GPU program, wherein the instructions in the shading language defining the layout are cross-compilable to a language executable by a CPU, wherein the GPU compiler is configured to cross-compile the instructions in the shading language defining the layout.

* * * * *